US009740511B2

(12) United States Patent
Lyashevsky

(10) Patent No.: US 9,740,511 B2
(45) Date of Patent: Aug. 22, 2017

(54) PER-BLOCK SORT FOR PERFORMANCE ENHANCEMENT OF PARALLEL PROCESSORS

(71) Applicant: Advanced Micro Devices, Inc., Sunnyvale, CA (US)

(72) Inventor: Alexander Lyashevsky, Sunnyvale, CA (US)

(73) Assignee: ADVANCED MICRO DEVICES, INC., Sunnyvale, CA (US)

( * ) Notice: Subject to any disclaimer, the term of this patent is extended or adjusted under 35 U.S.C. 154(b) by 56 days.

(21) Appl. No.: 14/730,499

(22) Filed: Jun. 4, 2015

(65) Prior Publication Data

US 2016/0357580 A1 Dec. 8, 2016

(51) Int. Cl.

| | |
|---|---|
| ***G06F 9/50*** | (2006.01) |
| ***G06F 9/445*** | (2006.01) |
| ***G06F 11/34*** | (2006.01) |
| ***G06F 11/30*** | (2006.01) |

(52) U.S. Cl.

CPC ............ *G06F 9/44505* (2013.01); *G06F 9/50* (2013.01); *G06F 11/3024* (2013.01); *G06F 11/3409* (2013.01); *G06F 11/3419* (2013.01); *G06F 11/3452* (2013.01)

(58) Field of Classification Search

CPC ......... G06F 7/22; G06F 7/24; G06F 2207/228

See application file for complete search history.

(56) References Cited

U.S. PATENT DOCUMENTS

2010/0031003 A1* 2/2010 Chen .................. G06F 9/30021 712/30
2013/0332446 A1* 12/2013 Zhou ................ G06F 17/30584 707/713
2014/0372456 A1* 12/2014 Merrill ............. G06F 17/30943 707/752
2015/0269119 A1* 9/2015 Sreedhar ............ G06F 15/8015 712/22

OTHER PUBLICATIONS

Nassimi et al., "Bitonic Sort on a Mesh-Connected Parallel Computer" (Jan. 1979), IEEE Transactions on Computers, vol. C-28, Issue 1, pp. 2-7 [retreived from http://ieeexplore.ieee.org/document/1675216/?arnumber=1675216].*

Lee, "MPI-bitonic-sort" (Dec. 20, 2012), pp. 1-5 [retrieved from https://github.com/adrianlee/mpi-bitonic-sort/blob/master/bitonic.c].*

Zhang et al., "GPU Accelerate Parallel Odd-Even Merge Sort: an Open CL Method" (2011), Proceedings of the 15$^{th}$ International Conference on Computer Supported Cooperative Work in Design, pp. 76-83 [retrieved fromhttp://ieeexplore.ieee.org/document/5960058/?arnumber=5960058].*

(Continued)

*Primary Examiner* — Brian W Wathen

(74) *Attorney, Agent, or Firm* — Volpe and Koenig, P.C.

(57) ABSTRACT

A method of enhancing performance of an application executing in a parallel processor and a system for executing the method are disclosed. A block size for input to the application is determined. Input is partitioned into blocks having the block size. Input within each block is sorted. The application is executed with the sorted input.

21 Claims, 4 Drawing Sheets

(56) References Cited

OTHER PUBLICATIONS

Batcher, "Sorting Networks and their Applications" (1968), Proceedings of the Spring Joint Computer Conference AFIPS '68, pp. 307-314 [retrieved from http://dl.acm.org/citation.cfm?id=1468121].*

Greβ et al., "GPU-ABiSort: Optimal Parallel Sorting on Stream Architectures" (2006), Proceedings of the 20th International Parallel and Distributed Processing Symposium, pp. 1-10 [retrieved from http://ieeexplore.ieee.org/document/1639284/?arnumber=1639284].*

Baraglia et al., "Sorting using Bitonic Network with CUDA" (2009), LSDR-IR Workshop, pp. 1-8 [retrieved from http://citeseerx.ist.psu.edu/viewdoc/download?doi=10.1.1.580.7989&rep=rep1&type=pdf].*

Ionescu et al., "Optimizing Parallel Bitonic Sort" (1996), pp. 1-102 [retrieved from https://ieee. icnp.org/research/tech_reports/reports/1996-14.ps].*

Satish et al. , "Fast Sort on CPUs and GPUs: A Case for Bandwidth Oblivious Simd Sort" (2010), Proceedings of the 2010 ACM SIGMOD International Conference on Management of data, pp. 351-362 [retrieved from http://d1.acm.org/citation.cfm?id=1807207].*

* cited by examiner

PER-BLOCK SORT FOR PERFORMANCE ENHANCEMENT OF PARALLEL PROCESSORS

TECHNICAL FIELD

The disclosed embodiments are generally directed to electronic processors, and in particular, to processors with parallel processing capabilities.

BACKGROUND

Performance of a memory-bound algorithm on a processor with parallel processing capabilities (hereinafter a "parallel processor"), such as, for example, a graphics processing unit (GPU) or central processing unit (CPU), an accelerated processing unit (APU), etc., may suffer from lack of input memory locality. Pre-processing of input data, before execution of the algorithm, may worsen performance by, for example, increasing execution time.

SUMMARY OF EMBODIMENTS

A method of enhancing performance of an application executing in a parallel processor and a system for executing the method are disclosed. A block size for input to the application is determined. Input is partitioned into blocks having the block size. Input within each block is sorted. The application is executed with the sorted input.

BRIEF DESCRIPTION OF THE DRAWINGS

A more detailed understanding may be had from the following description, given by way of example in conjunction with the accompanying drawings wherein.

DETAILED DESCRIPTION OF THE EMBODIMENTS

Figure 1:
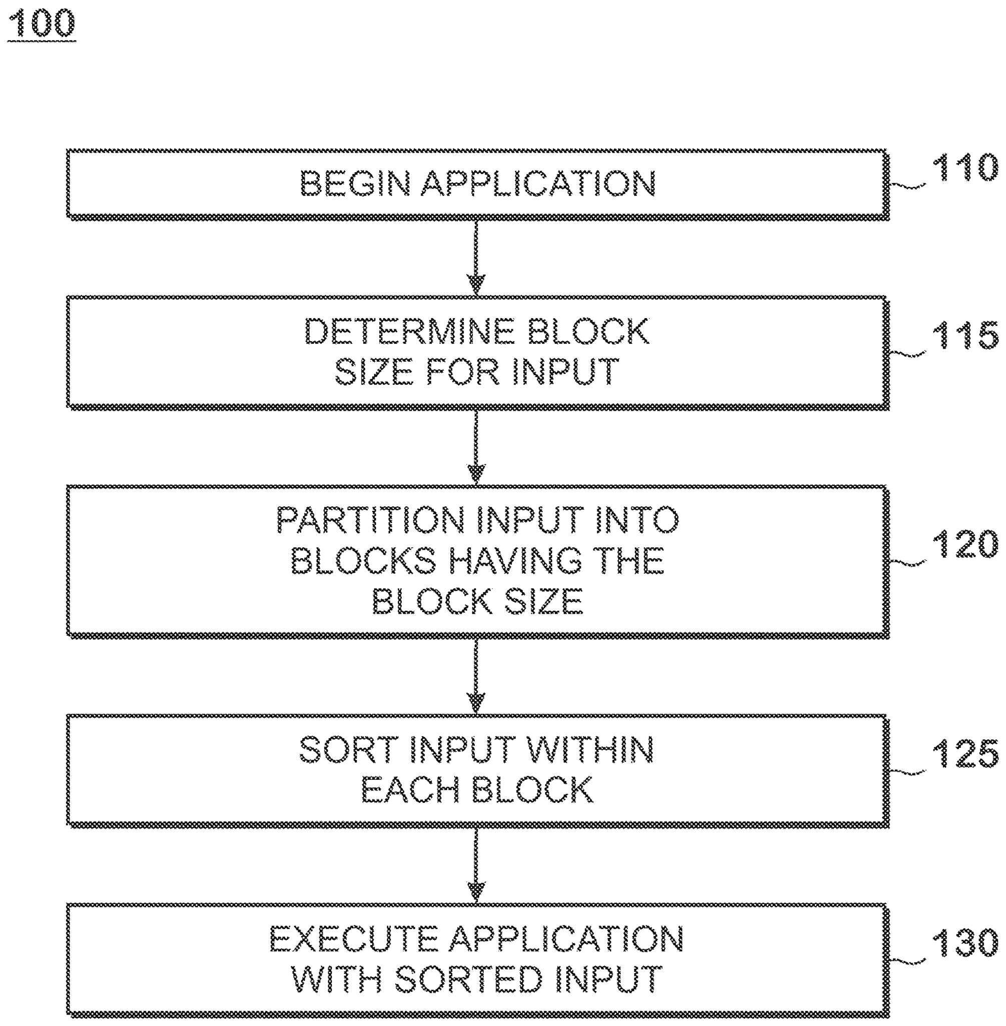
FIG. 1 shows an overview of a method of enhancing performance of a parallel processor.

Some applications intended to run on parallel processors such as graphical processing units (GPUs) may be "memory bound." By definition, performance of such applications, as measured by a performance metric such as execution time, are limited, or dominated, by performance of one or more memories, either internal or external to the processor.

Sorting of input data may be a very efficient method of increasing data input locality and decreasing bandwidth to directly affect performance of certain memory bound applications, such as binary searches. However, the sorting algorithm might be relatively slow, and applying the sorting to all of the input data may increase the total execution time of the application, thus defeating the purpose of sorting.

On the other hand, instead of sorting the entirety of input data, it may be beneficial to split the input data into blocks with a block size and to apply the sorting algorithm to each block individually. The resulting input is sorted only partially but for a particular determined block size, a significant improvement in performance of a memory-bound application might be obtained. In an example, not to be considered limiting, a known type of sorting algorithm called a parallel bitonic sort may be executed to sort input data. The parallel bitonic sort complexity is on the order of $N^*(\log_2 N)^2$, where N is an input size. That is, the complexity, which may be reflected in an execution time, grows proportionally to a square of a logarithm of an input size. By contrast, sorting by block increases performance (e.g. execution time) by $(\log_2 N/\log_2 B)^2$, where B is a block size. At the same time, partitioning input into blocks may decrease the performance of the original algorithm with a fully sorted input, but only negligibly. If a block size is small enough a performance increase might be significant.

Such sorting or partial sorting of input data may result in measurable or perceived improvement in the performance of applications that may become memory-bound. Examples of such applications may include, as examples, video encoding, video decoding, image processing, image enhancement, image editing, and various forms of image modification.

Doing an entire bitonic sort over a block by a single GPU group with a reasonably low block size increases an actual GPU occupancy and utilization and, as a consequence, GPU performance. However the block has to be large enough to significantly improve performance of an original application compared to performance of that application with fully sorted input. As an example, a time needed to sort and then search for a specific item in a set of input data may be less than a time needed to perform a search for the same item when the input data is unsorted. For example, a binary search could benefit from sorted input. In order to obtain such performance benefits, however, it may be necessary to determine a particular block size.

Such a particular block size may depend on the specific application and might be found while the application is running, i.e. "at run time". A particular block size may vary and be determined dynamically throughout execution of the application. A relatively fast search for a particular block size may be achieved by trying block sizes related to each other by distinct powers of two—that is, trying blocks of size 1, 2, 4, 8, 16, etc. in some appropriate unit.

As an example, not to be considered limiting, in OpenCL the implementation of a parallel bitonic sort may be done with one block per one GPU group similar to a persistent GPU thread technology. Such solution enables keeping a global memory consistency between all stages of the bitonic sort for a GPU group and enables reusing a GPU local shared memory to avoid frequent requests from a global memory. As an example, an OpenCl kernel that implements bitonic sort per block for input array in a double float format is shown in Table 1. A similar algorithm could be applied to any format of the sorting key, such as int, long, or float.

TABLE 1

```
#define LG__MAX__LOCAL__DISTANCE 9
#define MAX__LOCAL__DISTANCE (1<<LG__MAX__LOCAL__DISTANCE)
void bitonicSort256(__global double *tiledArray, __local double * left__right, __global
uint* indexArray, __local uint *lr__indexes,
                    uint n__stages,
                    uint direction,
```

TABLE 1-continued

```
                              uint start__stage, uint end__stage,
             uint start__pass, uint end__pass
                              )
{
  uint lcl__id = get__local__id(0);
  uint pairDistance = MAX__LOCAL__DISTANCE;
  uint blockWidth = pairDistance*2;
// loop over local memory-size buffers
  for( uint threadId = lcl__id; threadId < (1 << (n__stages−1)); threadId +=
MAX__LOCAL__DISTANCE) {
// read into local memory once
    uint leftId0 = (threadId % pairDistance) + (threadId / pairDistance) *
blockWidth;
    for(uint l = lcl__id; l < blockWidth; l += 256) {
             left__right[l] = tiledArray[leftId0 + l − lcl__id];
//           printf("%d %lf %d %lf\n", lcl__id + l, left__right[lcl__id + l], leftId0 + l ,
tiledArray[leftId0 + l]);
               lr__indexes[l]= indexArray[leftId0 + l − lcl__id];
      }
      barrier(CLK__LOCAL__MEM__FENCE);
      uint loop__counter = 0;
      for(uint stage = start__stage; stage < end__stage; ++stage) {
// all passes needed
     for(uint passOfStage = start__pass; passOfStage < stage+1; ++passOfStage,
loop__counter++) {
                   uint pairDistance = 1 << (stage − passOfStage);
      uint blockWidth = 2 * pairDistance;
      for( uint l = lcl__id, lcl__threadId = threadId; l < MAX__LOCAL__DISTANCE;
l+=256, lcl__threadId+=256) {
               uint leftId = (l % pairDistance) + (l / pairDistance) *
blockWidth;
          uint rightId = leftId + pairDistance;
        bitonicSortLcl(left__right, lr__indexes,
             stage,
             passOfStage,
             direction,
                                        lcl__threadId,
                                        leftId,
                                        rightId);
           }
                 barrier(CLK__LOCAL__MEM__FENCE);
        }
     }
    for(uint l = lcl__id; l < blockWidth; l += 256) {
          tiledArray[leftId0 + l − lcl__id] = left__right[l];
            indexArray[leftId0 + l − lcl__id] = lr__indexes[l];
     }
    barrier(CLK__GLOBAL__MEM__FENCE);
  }
}
__kernel
void bitonicSortTiled(__global const double * theArray,
        __global double * sortedArray,
        __global uint *theIndexArray,
        uint total__length,
        uint tile__length,
        uint n__stages,
        uint direction)
{
  uint groupID = get__group__id(0);
     uint icl__id = get__local__id(0);
     __global double* origArray = &theArray[groupID * tile__length];
     __global double* tiledArray = &sortedArray[groupID * tile__length];
     __global uint *indexArray = &theIndexArray[groupID * tile__length];
     __local double left__right[MAX__LOCAL__DISTANCE*2];
     __local uint lr__indexes[MAX__LOCAL__DISTANCE*2];
     uint passOfStage;
  uint index = lcl__id;
     for(uint index = lcl__id; index < (1 << n__stages); index += 256)
     {
        indexArray[index] = index + groupID * tile__length;
        tiledArray[index] = origArray[index];
      }
      barrier(CLK__GLOBAL__MEM__FENCE);
      bitonicSort256(tiledArray, left__right, indexArray, lr__indexes,
n__stages,direction, 0, LG__MAX__LOCAL__DISTANCE + 1, 0,
LG__MAX__LOCAL__DISTANCE + 1 );
  for(uint stage = LG__MAX__LOCAL__DISTANCE + 1; stage < n__stages; ++stage) {
    // Every stage has stage + 1 passes
    for(passOfStage = 0; (passOfStage < stage + 1) && ((stage − passOfStage ) >
```

TABLE 1-continued

```
LG_MAX_LOCAL_DISTANCE); ++passOfStage) {
                    uint pairDistance = 1 << (stage - passOfStage);
        uint blockWidth = 2 * pairDistance;
                    // group
                    for(uint threadId = lcl_id; threadId < (1 << (n_stages - 1));
threadId += 256) {
        // left ID
            uint leftId = (threadId % pairDistance) + (threadId / pairDistance) *
blockWidth;
            // + global right distance
            bitonicSortGlbl(tiledArray, indexArray, stage, passOfStage, direction,
threadId, leftId, (leftId + pairDistance));
                    }
                barrier(CLK_GLOBAL_MEM_FENCE);
            }
            bitonicSort256(tiledArray, left_right, indexArray, lr_indexes, n_stages,
direction, stage, stage+1, passOfStage, stage+1);
        }
}
```

FIG. 1 shows an overview of an embodiment 100 of a method of enhancing performance of a memory-bound application executing in a parallel processor. The application begins executing at 110. A block size for the input is determined 115. An example embodiment of determining a block size is described below. The input is partitioned into blocks having the determined block size 120. Input within each block is sorted, or partially sorted, 125. This sorting within each block may include executing a bitonic sort. The application is executed with the resulting sorted input 130.

Figure 2:
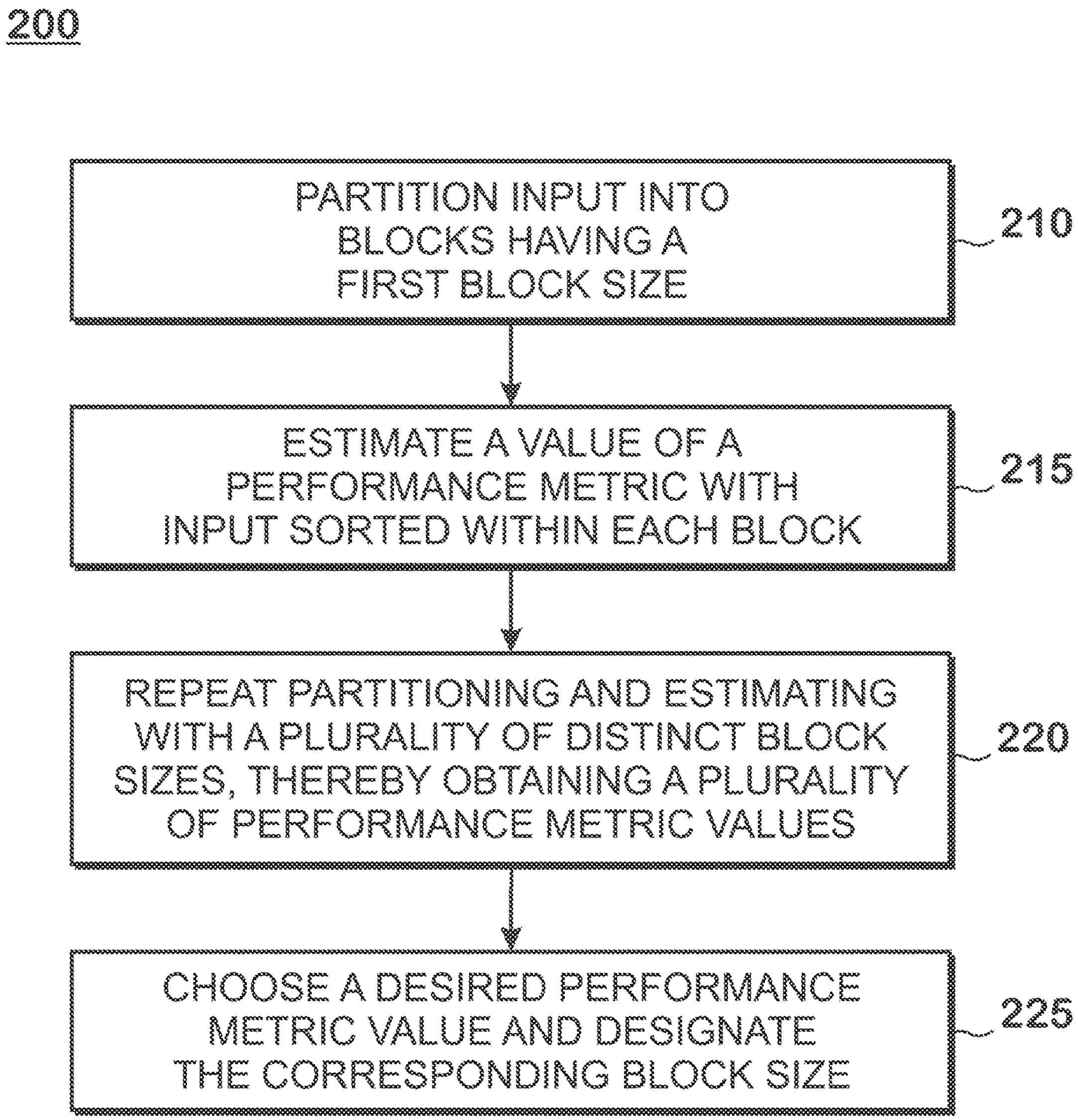
FIG. 2 shows an overview of an embodiment of one portion of the method.

FIG. 2 shows an embodiment of a method 200 of determining a block size for input. Input is partitioned into blocks having a first block size 210. A value of a performance metric for the application is estimated with input sorted within each of the blocks having the first block size 215. Examples of performance metrics include at least one of an execution time, a temperature of the processor, a power efficiency, an energy efficiency, a processor reliability, an error rate, a reliability of a system that includes the processor, and a measure of contention for use of a memory by the processor or any other component in a system.

Partitioning of the input and estimating of performance metric values are repeated or iteratively assessed for a plurality of distinct block sizes 220. In this manner, a plurality of performance metric values is obtained, each performance metric value corresponding to a block size. Partitioning into the various block sizes and estimating a performance metric value for each block size may be performed in parallel for at least two of the distinct block sizes. Alternatively, estimating of performance metric value for all selected block sizes may be performed in parallel. Alternatively, estimating a performance metric value for each block size may be performed sequentially. Alternatively, any combination of sequential and parallel partitioning and estimating may be used to determine a performance metric value for each block size.

A desired performance metric value may be chosen from the plurality of performance metric values and a corresponding block size may be designated as the block size 225. This block size may then be used in the method of FIG. 1, starting at 120. Examples of desired performance metric value may include, but are not limited to, at least one of: a minimal execution time, a minimum temperature of the processor, a maximum power efficiency, a maximum energy efficiency, a maximum reliability of the processor, a maximum reliability of a system that includes the processor, and minimizing a contention for use of a memory. Such performance metrics are highly desired by users of a device. For example, a user of portable or mobile device (e.g., a laptop, mobile smartphone, etc.) may acquire such a device solely (or primarily) related to execution time of a desired application, longevity of the device on battery power, etc. Consequently, devices embodying aspects of the invention may be highly desired as a result of the improvement of these performance characteristics.

Figure 3:
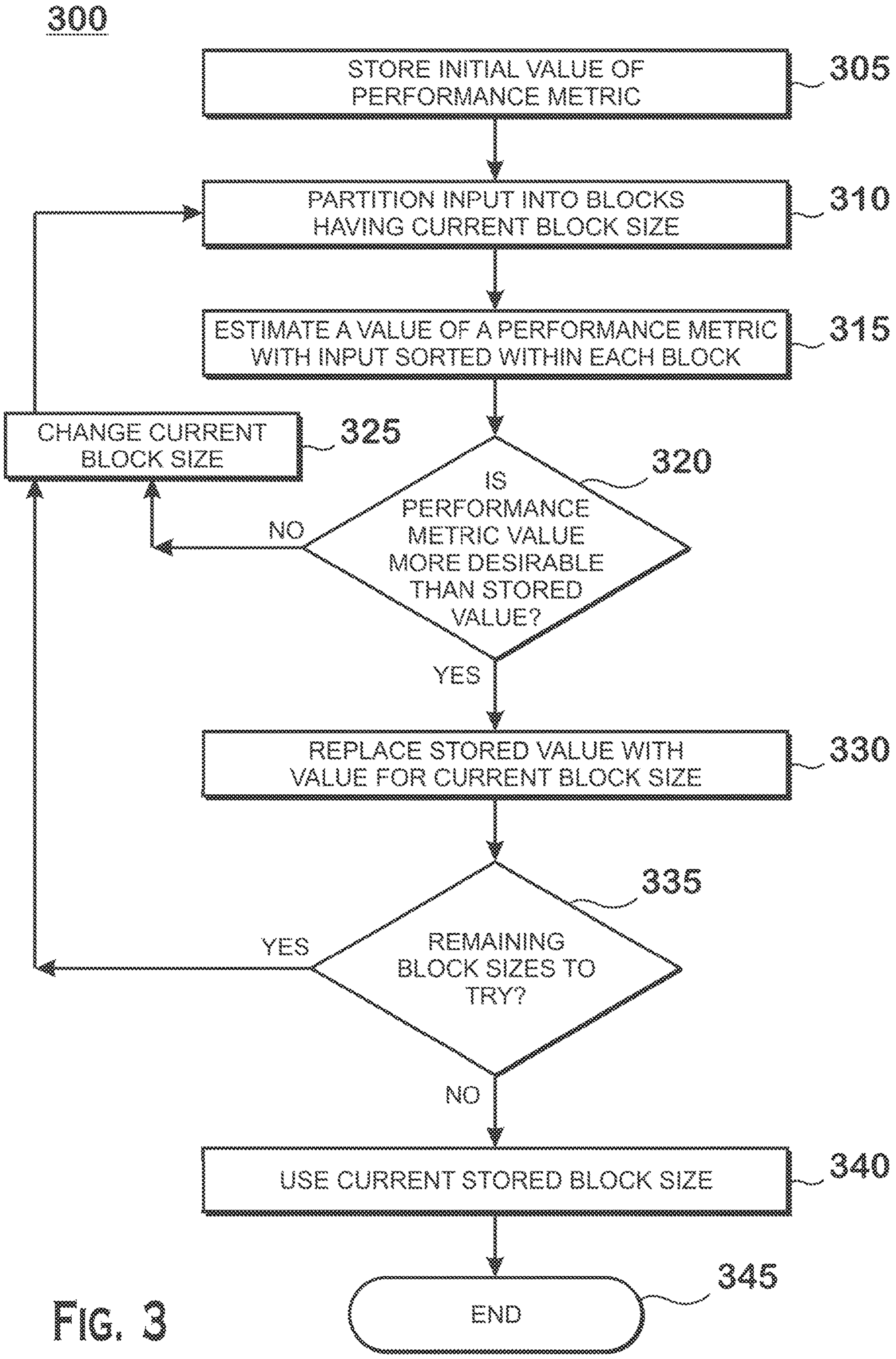
FIG. 3 shows an embodiment of one portion of the method.

FIG. 3 shows a more detailed example of a method 300 for determining a block size. An initial value of a performance metric value is stored in a memory 305. Input is partitioned into blocks having a current block size 310. A performance metric value for an application is estimated with the input sorted within each of the blocks having the current block size 315. The estimated performance metric value is compared with the stored value 320. If the estimated value is not more desirable than the stored value, the current block size is changed 325 and the input is partitioned using the changed current block size 310. The steps 310, 315 and 320 are repeated.

If the estimated value is more desirable than the stored value at 320, then the stored value is replaced by the performance metric value estimated for the current block size 330. Examples of the estimated value being more desirable than the stored value include, but are not limited to at least one of: the estimated value is a shorter execution time than a stored execution time; the estimated value is a running temperature of the processor that is less than a stored temperature; the estimated value is a power efficiency that is greater than a stored power efficiency; the estimated value is an energy efficiency that is greater than a stored energy efficiency; the estimated value is a reliability of the processor that is greater than a stored reliability of the processor; the estimated value is a reliability of a system that includes the processor that is greater than a stored reliability of a system that includes the processor; or the estimated value is a measure of contention for use of a memory that is less than a stored measure of such contention.

Continuing a description of FIG. 3, a determination is made whether or not there are remaining block sizes to try 335. If there are, the block size is changed 325 and the method repeats starting at 310. If there are no remaining block sizes to try at 335, then the current stored block size is used as the block size 340, since the method has guaranteed that the currently stored block size is desirable, i.e. that block size yields an enhanced performance. This block size may be used at 120 in the method of FIG. 1. The method of FIG. 3 ends 345.

Figure 4:
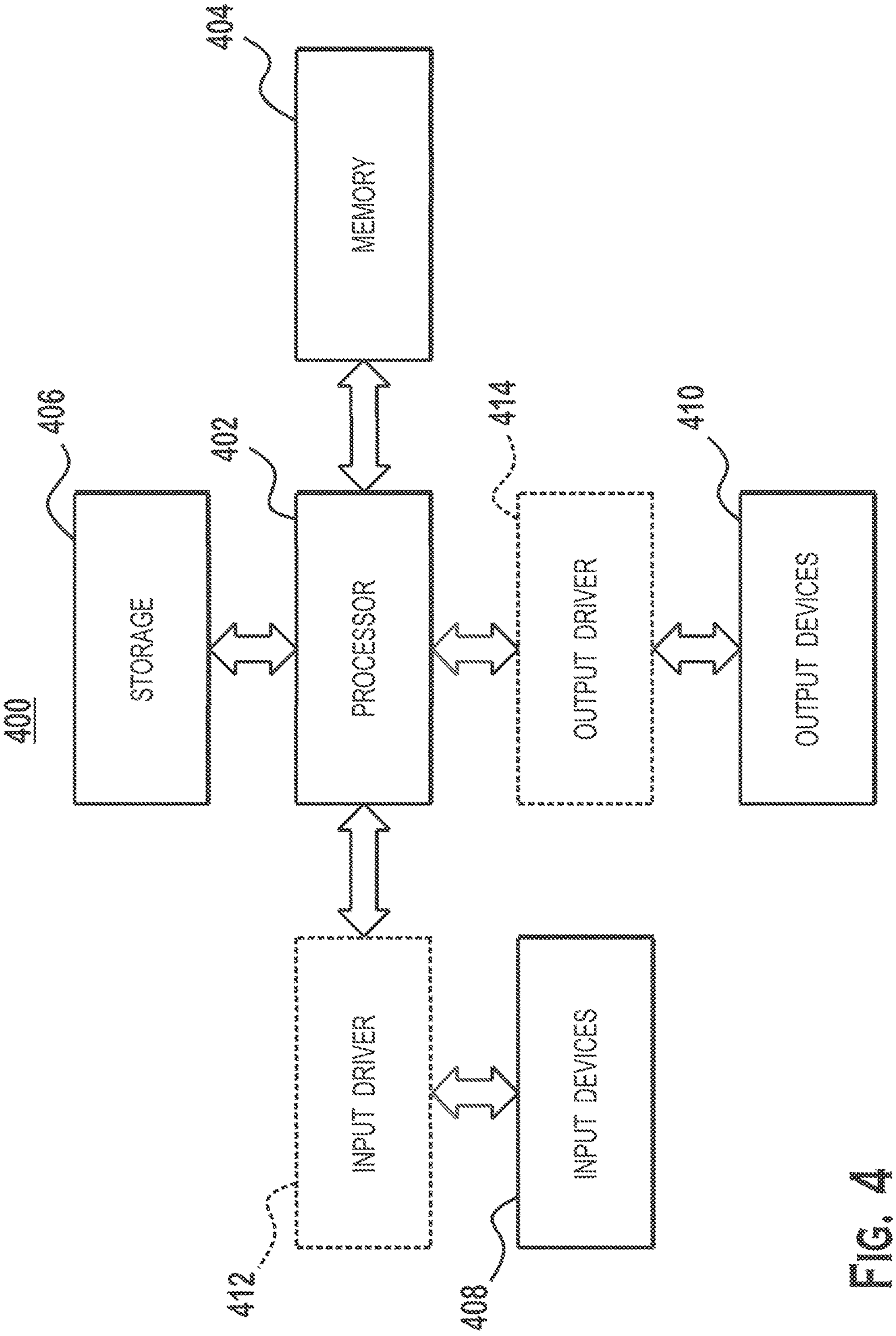
FIG. 4 is a block diagram of an example system in which one or more disclosed embodiments may be implemented

FIG. 4 is a block diagram of an example system, or device, 400 in which one or more disclosed embodiments may be implemented. The system 400 may include, for example, a computer, a gaming device, a handheld device, a set-top box, a television, a mobile phone, or a tablet computer. The system 400 includes a processor 402, a memory 404, a storage 406, one or more input devices 408, and one or more output devices 410. The system 400 may also optionally include an input driver 412 and an output driver 414. It is understood that the system 400 may include additional components not shown in FIG. 1.

The processor 402 may include a central processing unit (CPU), a graphics processing unit (GPU), a CPU and GPU located on the same die, or one or more processor cores, wherein each processor core may be a CPU or a GPU. The memory 404 may be located on the same die as the processor 402, or may be located separately from the processor 402. The memory 404 may include a volatile or non-volatile memory, for example, random access memory (RAM), dynamic RAM, or a cache.

The storage 406 may include a fixed or removable storage, for example, a hard disk drive, a solid state drive, an optical disk, or a flash drive. The input devices 408 may include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 410 may include a display device, a speaker, a printer, a haptic feedback device, one or more lights, an antenna, or a network connection (e.g., a wireless local area network card for transmission and/or reception of wireless IEEE 802 signals).

The input driver 412 communicates with the processor 402 and the input devices 408, and permits the processor 402 to receive input from the input devices 408. The output driver 414 communicates with the processor 402 and the output devices 410, and permits the processor 402 to send output to the output devices 410. It is noted that the input driver 412 and the output driver 414 are optional components, and that the system 400 will operate in the same manner if the input driver 412 and the output driver 414 are not present.

System 400 may be configured to enhance performance of a memory-bound application. Processor 402 may be a parallel processor configured to execute the application. Memory 404 or storage 406 may be configured to store input for the application and exchange the input and other information with processor 402. Input for the application may be entered by input devices 408 and optionally also by input driver 412. Processor 402 may be configured to enhance performance of the application by determining a block size for an input to the application; partitioning the input into blocks having the block size; sorting the input within each block; and executing the application with the sorted input. Processor 402 may include a graphical processing unit (GPU).

Processor 402 may be configured to sort input within each block by executing a bitonic sort on the input within each block. Processor 402 may be configured to sort the input within each block by executing a parallel bitonic sort with one graphical processing unit group (GPU group) per block or with an equivalent of a GPU group per block.

Output device 410, and optionally, output driver 414, may be configured to provide a result of the execution of the application. Output device 410 may include a visual display.

Processor 402 may be configured to determine a block size by executing a method such as that shown in FIG. 2, namely by partitioning the input into blocks having a block size; estimating a value of a performance metric for the application with the input sorted within each of the blocks having the block size; repeating the partitioning and estimating with a plurality of distinct block sizes, thereby obtaining a plurality of performance metric values; and choosing a desired performance metric value among the plurality of performance metric values and designating the block size corresponding to the desired performance metric as the block size.

Processor 402 may be configured to perform the partitioning and estimating in parallel with at least two distinct block sizes in the plurality of distinct block sizes. Processor 402 may be configured to select block sizes in the plurality of distinct block sizes that are related to each other by distinct powers of two.

Processor 402 may be configured choose as the desired performance metric value at least one of: a minimal execution time, a minimum temperature of the processor, a maximum power efficiency, a maximum energy efficiency, a maximum reliability of the processor, a maximum reliability of the system, and minimizing a contention for use of a memory.

Processor 402 may be configured to choose as the desired performance metric value an execution time that is less than an execution time obtained without the sorting of the input.

Processor 402 may be configured to determine the block size dynamically throughout execution of the application.

System 400 may be configured to determine a block size by executing a method such as that shown in FIG. 3. An initial value of a performance metric value may be stored in memory 404 or storage 406. Processor 402 may be configured to partition input from input devices 408, optionally also involving input driver 412, into blocks having a block size. Processor 402 may be configured to estimate a performance metric value for an application with the input sorted within each of the blocks having the block size. Processor 402 may be configured to compare the estimated performance metric value a current value stored in memory 404 or storage 406. If the estimated value is not more desirable than the stored value, processor 402 may change the block size block partition the input using the changed block size. Processor 402 may be configured to repeat the partitioning, estimating, and comparing. Processor 402 may be configured to replace the stored value by the performance metric value estimated for the current block size if the estimated value is more desirable than the stored value. Examples of the estimated value being more desirable than the stored value include, but are not limited to, the examples described hereinbefore.

Processor 402 may be configured to determine whether or not there are remaining block sizes to try. If there are, processor 402 may be configured to change the block size and repeat the method just described, starting with partitioning input into blocks having the changed block size. If there are no remaining block sizes to try, then the current stored block size may be used by processor 402 as the block size for executing the application.

Memory 404, storage 406, or both may be configured to store unsorted input and sorted input.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method of enhancing performance of an application executing in a parallel processor, the method comprising:
- partitioning input into blocks having a block size, wherein the block size has been selected to enable partial sorting of the input;
- partially sorting the input within each block; and
- executing the application with the partially sorted input,
- wherein the block size is determined by:
  - partitioning the input into blocks having a first block size;
  - estimating a value of a performance metric for the application with the input partially sorted within each of the blocks having the first block size;
  - repeating the partitioning and the estimating with a plurality of distinct block sizes, thereby obtaining a plurality of performance metric values; and
  - choosing a desired performance metric value among the plurality of performance metric values and designating a block size corresponding to the desired performance metric as the block size.

2. The method of claim 1, wherein the parallel processor comprises at least one of a graphical processing unit (GPU) and a central processing unit (CPU).

3. The method of claim 1, wherein partially sorting the input within each block comprises executing a bitonic sort.

4. The method of claim 1, wherein partially sorting the input within each block comprises executing a parallel bitonic sort with at least one of a graphical processing unit group (GPU group) and a central processing unit (CPU) per block.

5. The method of claim 1, wherein the partitioning and estimating with a plurality of distinct block sizes are performed in parallel for at least two of the distinct block sizes.

6. The method of claim 1, wherein block sizes in the plurality of distinct block sizes are related to each other by distinct powers of two.

7. The method of claim 1, wherein choosing a desired performance metric value comprises choosing at least one of: a minimal execution time, a minimum temperature of the processor, a maximum power efficiency, a maximum energy efficiency, a maximum reliability of the processor, a maximum reliability of a system that includes the processor, and minimizing a contention for use of a memory.

8. The method of claim 1, wherein choosing a desired performance metric value comprises choosing an execution time that is less than an execution time obtained without the sorting of the input.

9. The method of claim 1, wherein the block size is determined dynamically throughout execution of the application.

10. The method of claim 1, further comprising providing a result of the executing of the application to a display device that displays the result.

11. A system configured to enhance performance of an application, the system comprising:
- a parallel processor configured to execute the application; and
- a memory configured to store input for the application and exchange the input and other information with the parallel processor;
- wherein the parallel processor is configured to enhance performance by:
  - partitioning input into blocks having a block size;
  - sorting the input within each block; and
  - executing the application with the sorted input,
- wherein the parallel processor is further configured to determine the block size by:
  - partitioning the input into blocks having a first block size;
  - estimating a value of a performance metric for the application with the input sorted within each of the blocks having the first block size;
  - repeating the partitioning and the estimating with a plurality of distinct block sizes, thereby obtaining a plurality of performance metric values; and
  - choosing a desired performance metric value among the plurality of performance metric values and designating a block size corresponding to the desired performance metric as the block size.

12. The system of claim 11, wherein the parallel processor comprises a graphical processing unit (GPU).

13. The system of claim 11, wherein the processor is configured to sort the input within each block by executing a bitonic sort on the input within each block.

14. The system of claim 11, wherein the processor is configured to sort the input within each block by executing a parallel bitonic sort with one graphical processing unit group (GPU group) per block.

15. The system of claim 11, further comprising an output device configured to provide a result of the execution of the application.

16. The system of claim 15, wherein the output device comprises a visual display.

17. The system of claim 11, wherein the processor is configured to perform the partitioning of the input into blocks having a block size and the estimating in parallel with at least two distinct block sizes in the plurality of distinct block sizes.

18. The system of claim 11, wherein the processor is further configured to select block sizes in the plurality of distinct block sizes that are related to each other by distinct powers of two.

19. The system of claim 11, wherein the processor is configured to choose as the desired performance metric value at least one of: a minimal execution time, a minimum temperature of the processor, a maximum power efficiency, a maximum energy efficiency, a maximum reliability of the processor, a maximum reliability of the system, and minimizing a contention for use of a memory.

20. The system of claim 11, wherein the processor is configured to choose as the desired performance metric value an execution time that is less than an execution time obtained without the sorting of the input.

21. The system of claim 11, wherein the processor is configured to determine the block size dynamically throughout execution of the application.

* * * * *